United States Patent [19]

Scott

[11] Patent Number: 5,739,928
[45] Date of Patent: Apr. 14, 1998

[54] TECHNIQUE PARTICULARLY SUITED FOR USE IN A PRINT PREVIEW FUNCTION FOR ADAPTING CRT COLORIMETRY TO AMBIENT LIGHTING CONDITIONS

[75] Inventor: Kevin Craig Scott, Rochester, N.Y.

[73] Assignee: Eastman Kodak Company, Rochester, N.Y.

[21] Appl. No.: 758,053

[22] Filed: Sep. 12, 1991

[51] Int. Cl.⁶ .............................. G03F 3/08; G03F 3/10
[52] U.S. Cl. ........................ 358/520; 358/527; 358/522
[58] Field of Search .................... 358/75, 76, 78, 358/80, 509, 516, 520, 527, 500, 530, 522; 345/145, 116; 395/159; 348/602

[56] References Cited

U.S. PATENT DOCUMENTS

| | | | |
|---|---|---|---|
| 4,220,412 | 9/1980 | Shroyer et al. | 356/218 |
| 4,285,009 | 8/1981 | Klopsch | 358/76 |
| 4,454,532 | 6/1984 | Itani et al. | 358/29 |
| 4,647,961 | 3/1987 | Kammoto et al. | 358/75 |
| 4,679,073 | 7/1987 | Hayashi | 358/80 |
| 4,706,108 | 11/1987 | Kumagai et al. | 358/10 |
| 4,716,285 | 12/1987 | Konishi | 250/205 |
| 4,716,457 | 12/1987 | Matsuo | 358/80 |
| 4,721,951 | 1/1988 | Holler | 358/80 |
| 4,731,661 | 3/1988 | Nagano | 358/75 |
| 4,742,387 | 5/1988 | Oshima | 358/29 |
| 4,758,885 | 7/1988 | Sasaki et al. | 358/80 |
| 4,763,186 | 8/1988 | Belmares-Sarabia | 358/80 |
| 4,812,829 | 3/1989 | Ebina | 345/145 |
| 4,819,060 | 4/1989 | Minema et al. | 358/29 |
| 4,827,119 | 5/1989 | Gaboury | 250/214 R |
| 4,922,330 | 5/1990 | Saito et al. | 358/29 |
| 4,930,004 | 5/1990 | Yamamoto et al. | 358/29 |
| 4,931,856 | 6/1990 | Hieda et al. | 358/29 |
| 4,952,917 | 8/1990 | Yabuuchi | 340/703 |
| 5,157,506 | 10/1992 | Hannah | 358/518 |
| 5,313,291 | 5/1994 | Appel et al. | 358/501 |
| 5,444,755 | 8/1995 | Haendle et al. | 348/602 |

FOREIGN PATENT DOCUMENTS 0085975  7/1981  Japan .................................. 358/475

OTHER PUBLICATIONS

F. W. Billmeyer et al, Principles of Color Technology, 2nd Edition, (© 1981; John Wiley & Sons, Inc., New York), pp. 21–23.
"Device Indepent Color Rendition"; Zeise & Buitano; Apr. 25, 1988; Eastman Kodak pp. 5&6.
"A Method for Matching Hardcopy Color to Display Color"; SID Digest; McManus & Hoffman pp. 204–206.

Primary Examiner—Thomas D. Lee
Assistant Examiner—Jerome Grant, II
Attorney, Agent, or Firm—Raymond L. Owens

[57] ABSTRACT

A technique, applicable for use in implementing a print preview function in a color electronic imaging system, that, under a variety of different ambient lighting conditions, will yield a highly acceptable color match between a color image appearing on a CRT monitor and that which will be produced by the system as a printed version of the same image. Specifically, a computer system (120) is employed to scan an image and, through an ambient illumination sensor (27), senses the spectral content of the ambient illumination. The computer displays the scanned image along with various non-image information which can be used to adjust the color of the image. The computer transforms the color of the scanned image and the non-image information such that a resultant display of the image and the non-image information on a color monitor (24) will show the appearance of a print when the print is viewed under the ambient illumination. The transformation of the non-image information includes transforming non-image monitor control signals into a first set of tristimulus values which are, in turn, transformed into printer control signals for an imaginary printer. These printer control signals are then transformed into tristimulus values using the sensed spectral content of the illuminant. This latter set of values are used to produce monitor control signals that are applied to the monitor.

26 Claims, 10 Drawing Sheets

TECHNIQUE PARTICULARLY SUITED FOR USE IN A PRINT PREVIEW FUNCTION FOR ADAPTING CRT COLORIMETRY TO AMBIENT LIGHTING CONDITIONS

TECHNICAL FIELD OF THE INVENTION

This invention relates to the reproduction of color images and, more particularly, to a technique suitable for use in implementing, for example, a print preview function in a color electronic imaging system that, under a variety of different ambient lighting conditions, will yield a highly acceptable color match between a color image appearing on a CRT display and that which will be produced by the system as a printed version of the same image.

BACKGROUND ART

One of the goals of color electronic imaging systems, used extensively in the field of desktop publishing, is to obtain a highly acceptable ("good") color match between a "soft" display (e.g. a cathode ray tube—CRT display) and a printed output of a reproduction system. A system that has a highly acceptable color match provides a user with an accurate prediction of a final printed output as it would appear when viewed under different illuminants. The current state of the art in obtaining a "good" color match in color electronic imaging systems is to first optimize the color match between a scanned original and the printed output under a "nominal" illuminant (i.e., the illuminant under which the print is intended to be viewed), and then model the appearance of the print under various "actual" illuminants (i.e. the variety of other illuminants under which the print could reasonably be expected to be viewed). In such systems, each colorimetric value that would appear on the print is duplicated on the CRT display (monitor) for viewing by the user.

Although such prior art systems have served the purpose, for primarily two reasons they have not proved entirely satisfactory in producing a "good" color match between the CRT display and the resulting print. First, human observers viewing an image on a CRT display will tend to adapt to a whitepoint of this display. This adaptation is based on all illuminated areas on the CRT display, including non-image areas, such as illustratively window borders and/or a so-called "desktop" background. As a result, colors that appear on the CRT display which are, in fact, an exact match with those in the print will instead appear to an observer as being mismatched.

Second, the selection of actual illuminants which can be modelled by the system is usually somewhat limited. In fact, the illumination of the print under ambient light may differ from all of the modelled illuminants. Consequently, the appearance of the print in the working environment, i.e., under ambient light, will not exactly match the image as shown on the CRT display. As such, the user will be viewing an apparent mismatch.

To obtain a color match sufficient for user viewing in the working environment, several well known visualization effects must be taken into account. One such effect is metamerism. Generally speaking, metamerism is the ability of two different objects, having differing spectral reflectance characteristics, to appear to an observer (whether a human or an instrument), under one illuminant, as having the same color. However, under another illuminant, the objects will appear different from each other. Such objects are commonly referred to as metameric objects. The color of any object is determined by both its spectral reflectivity or transmissivity and the spectral content of its illuminant. Metamerism occurs because many different spectral reflectance characteristics can all exhibit the same set of color coordinate values. However, metameric objects will exhibit different, i.e mismatched, colors if the observers have different spectral responses or if illuminants with differing spectral content are used to view both objects at once. See, e.g., pages 21–23 of F. W. Billmeyer et al, *Principles of Color Technology*, 2nd Edition (© 1981: John Wiley & Sons, Inc., New York) for a discussion of metamerism.

Now, it is well known that the spectral content of an illuminant modifies the color of an image of an object being captured through a conventional photographic or electronic process and also modifies the color of an image on a photographic or electronic print that is being viewed or scanned. Different types of light sources will have differing spectral contents. Some of these light sources, while being spectrally different, may also have the same or different colorimetric whitepoints. In either case, the color of illuminated objects will differ in response to the different light sources. Though humans will adapt to various whitepoints, metamerism, as described above, may cause the perceived color of objects, including those appearing on a CRT display, to change in a manner different from that which would be expected solely from the adaptation.

Metamerism has the following two effects on an electronic imaging system. First, as expected, when an original is scanned by a sensor, resulting image data is influenced by both the spectral content of the illumination source along with the spectral response of the sensor. If a three-channel sensor is used to scan an original, as is typically the case, it will be nearly impossible to subsequently determine exactly what the color of the original would have been had a different illuminant been used to illuminate the original during scanning. At the present time, it is simply not economically feasible to record enough channels of data to represent the appearance of the original under each one of a number of differing lighting conditions, i.e. under each of a variety of different illuminants. As such, this restricts a user's ability to undertake accurate side-by-side color matching of the print with the original in the working environment. Hence, for side-by-side color matching of such prints, the user must rely on using illumination that is spectrally equivalent to that used in the scanning process, else color mismatches will likely be produced.

Second, when a print is produced, its image data must generally be processed in a manner that is specific to a nominal illuminant, e.g. the illuminant under which the print is expected to be viewed. However, it is simply impractical to require a user to view a print under only one specific light source. Therefore, it is necessary to determine that the print will appear satisfactory under a variety of different light sources. In that regard, one can now model how a given print will appear under any light source including an ambient light source.

People judge color relative to their environment. People use familiar objects of known colors as reference points and often discount the color of the ambient light source. For example, if a person is placed in a room with yellow illumination, handed a white piece of paper, and asked what color the paper was, the response would generally be "white," even though the light reflected from the paper was yellow. This response occurs because the viewer has innately and subconsciously compensated for the fact that all objects in the room appear yellowish.

In recent experiments conducted by Roy Berns at the Rochester Institute of Technology in Rochester, New York (the "Berns experiments"), it was shown that people generally adapt to an image on a CRT display independently of the color of the ambient light. In the Berns experiments, human subjects were asked to match colors painted on a CRT display with the same colors that appeared on a printed chart. When the whitepoint of the background of the image appearing on the CRT display differed from that of the ambient light, these subjects made errors in matching the colors. These errors arose because the subjects judged the colors on the CRT display relative to that of the background of the displayed image. In this instance, the subjects used the non-image areas displayed on the CRT (e.g. window borders and "desktop" background) as reference points independent of the ambient light. The subjects responded in this fashion evidently because they realized that the CRT display generates its own light source. As such, these experiments indicate that the "environment" for color reference points of a CRT image is generally limited to whatever is shown on the screen of the CRT, especially in the non-image, e.g. background, areas.

These visualization effects complicate attempts to provide an acceptable color match between an image displayed on a CRT display and a print of that image. If an electronic imaging system attempts to present a colorimetrically matched image on a CRT display, a user will have adapted to the whitepoint of the CRT display and hence will perceive that the image is displayed with incorrect color when, in fact, it is not.

One traditional approach to dealing with these complications is to show the image in the CRT display with all non-image areas "blanked out." Unfortunately, this approach disadvantageously eliminates any information previously contained in areas that have been "blanked out". More important, the "blanked-out" areas which, for example, may be solid blue or yellow or white, will still have a whitepoint that normally will adversely affect a viewer's perception of the colors of the image displayed on the CRT. For example, if the "blanked-out" area is black, the viewer will perceive the CRT image as it would appear with a black border which is not the environment in which the print will be actually viewed.

Another such approach involves "adapting" the image appearing on a CRT display to the whitepoint of the display in order to compensate for how a user will adapt to the whitepoint of the display. See, specifically, co-pending United States Patent Application "Method for the Reproduction of Color Images Based on Viewer Adaptation" (Ser. No. 07/678,485; filed Apr. 1, 1991 by inventor D. Statt and assigned to the present assignee) which addresses this approach. Although this approach can provide adequate results, it does not insure that the user's adaptation to the CRT display will be exactly the same as that to the environment in which the print will be actually viewed.

Consequently, a need still exists in the art in connection with the on-going development of color electronic imaging systems for a technique, particularly for use in implementing a print preview function, that, under a variety of different ambient lighting conditions, will effectively yield a highly acceptable color match between a color image appearing on a CRT display and that which will be produced by such a system as a printed version of the same image. Such a technique must also be substantially unaffected by viewer adaptation to the whitepoint of the CRT display as well as any associated observer metamerism.

DISCLOSURE OF THE INVENTION

Accordingly, an object of the present invention is to provide a print preview function in a color electronic imaging system that will provide a highly acceptable color match between a color image appearing on a CRT monitor, under a variety of different ambient lighting conditions, and that which will be produced as a print by such a system.

To attain this and other objects, the present invention is a color electronic imaging system that has a color input means for providing color input data of an object, an illumination input means for providing illumination data on selective illuminants, and a color display monitor for displaying the object and non-image information. "Non-image" is defined to be anything, such as, illustratively, window borders, menus and icons, that is displayed but is not, from an application standpoint, the image that a user is manipulating. The system also includes a computer which is connected to the color input means, the illumination input means, and the color display monitor. The computer generates non-image color control signals for displaying the non-image information on the monitor and selectively transforms both the color input data and the non-image color control signals, using the spectral content of a selected illuminant, into a composite color control signal for the monitor in order to display a color image of the object and the non-image information as they would appear on a print when the print is viewed under the selected illuminant, such as the ambient illuminant.

The system also includes an illuminant sensor for obtaining spectral information of the ambient light source. This information is then used to adjust the image colors that are to appear on the CRT display.

Broadly speaking, my invention provides an electronic imaging system with a print preview function through which the spectral content of the ambient illumination is used to change the colors of the entire display, not just the image areas, in the exact same manner that the colors that would appear in a print of the image as produced by the system would be affected by the spectral content of its ambient illumination. Consequently, the system will cause all image and non-image areas of the display to behave as if they are illuminated by the same ambient light source that would be illuminating the print. As a result, a user's color "frame of reference" on the display will match that of the working environment. By preventing separate adaptation between the display and the environment, users will be better able to match colors on the display with colors on the print and thereby generate more accurate color prints than has been heretofore possible with electronic imaging systems known in the art. Furthermore, since the colors that a user will perceive from the CRT display are substantially the same colors that will be seen in the actual print that will be produced by the system, a user will gain increased and more effective control over a color printing process through an electronic imaging system that utilizes my inventive technique than through such a system that does not.

Of course, owing to the effects of metamerism and gamut limitations inherent in a typical color printing process, it is quite likely that some residual color mismatches will result from use of my inventive technique between the colors in a print and those in a corresponding original. Clearly then, my invention matches the colors, both colorimetrically and as perceived by a viewer, that appear in the CRT display to those that will appear on the print, but not the colors in the print to those in the original. Nevertheless, due to the accurate ability of my inventive technique to predict resulting colors of the print, use of my invention will allow a user to interactively adjust the colors of the print to be closer to those of the original than would likely result if my inventive technique were not to be used.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to denote identical elements that are common to various figures.

MODES OF CARRYING OUT THE INVENTION

Figure 1A:
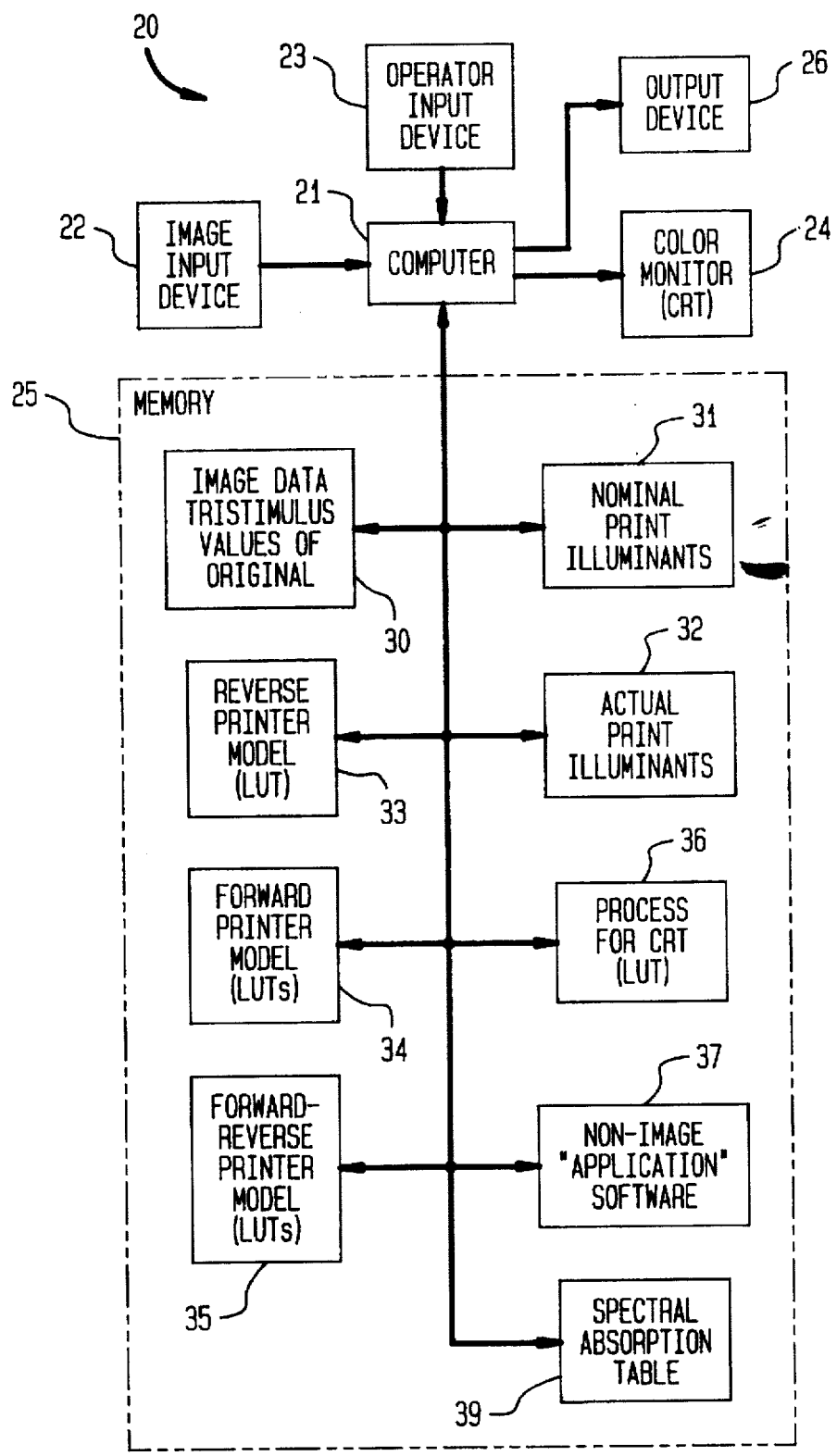
FIG. 1A is a block diagram of a prior art color electronic imaging system.

Referring to the drawings. FIG. 1A shows prior art color electronic imaging system 20 having computer 21 connected to image input device 22, operator input device 23, color monitor (CRT display) 24, output device 26, and memory 25. Image input device 22 may be a conventional digital device, such as illustratively a color film scanner or electronic color camera, that samples the radiant flux of an object and generates digital color information signals, such as for standard primary colors red, green, blue (R,G,B). Alternatively, input device 22 may be a computer color graphics generator having an instrument, such as a keyboard, mouse or pen, that permits an operator to electronically draw or trace and paint an object. In any case, computer 21 typically receives tristimulus values as, for example, R,G,B samples or equivalent signals. The R,G,B samples are typically converted to the CIE (Commission Internationale de l'Eclairage) standard X,Y,Z tristimulus values and then stored as image data 30 in memory 25. Blocks 30–39 specify particular items that are stored within this memory.

Computer 21 performs selected operations on image data 30 under the control of an operator, via operator input device 23, e.g. a keyboard or a mouse, as the operator previews an image of the object on the screen of color monitor 24. The computer can be implemented using either a general-purpose computer or a special-purpose computer designed for image and/or graphics processing and color graphics printing via output device 26. Output device 26 may be a color printer, a color plotter, or any other suitable device for transferring a color image onto an output medium, such as paper or any other suitable "hard-copy" print surface.

In preparation for viewing the color image of an original, the operator typically specifies, via input device 23, a set of actual print illuminants 32 and one or more nominal print illuminants 31. The spectral content of these illuminants 31 and 32 are loaded into memory 25. This may be accomplished either by simply selecting among standard commercial illuminants that have had their spectral contents previously stored in computer 21, or by measuring the spectra associated with each one of various different illuminants and then selecting one of measured spectrums.

Look-up tables (LUTs) 33 and 34, produced by computer 21 during printer calibration, are also stored in memory 25. When output device (printer) 26 is calibrated in a conventional manner, a set of printed test patches is measured. The spectral absorption of each patch is either measured, or calculated based on measured tristimulus values, or other colorimetrically defined units, and prior knowledge of the spectral absorption of each printing dye. A three- or four-dimensional spectral absorption table 39 is then constructed and stored in memory 25. Each axis of the table 39 is indexed by printer control signals; the number of axes depends on the number of printer channels (e.g. C,M,Y or C,M,Y,K). Each entry in table 39 contains spectral absorption data, i.e. each entry contains a vector of absorption values sampled periodically through the spectrum. This absorption data is the combined absorption of all of the dye layers, as printed and measured. Table 39 remains constant until the next time the printer is calibrated; it does not depend on ambient lighting.

Using spectral absorption table 39, each nominal print illuminant 31 is used to generate well-known reverse printer model LUT 33. Also, using table 39 and actual print illuminants 32, computer 21 generates a set of well-known forward printer model LUTs 34 that, in turn, is combined with reverse printer model LUTs 33 to produce a set of forward-reverse printer model LUTs 35.

Also residing in memory 25 is a process for CRT LUT 36 and non-image "application software" 37. In this context and broadly speaking, the term "application software" is defined as including all software that would generate CRT data, such as graphics, text, icons, windows, and the like, whether generated by an operating system, a shell, a user-generated program, or other program. In addition, the term "non-image" is defined to be anything, such as, illustratively, window borders, menus and icons, that is displayed but is not, from an application standpoint, the image that a user is manipulating.

Figure 1B:
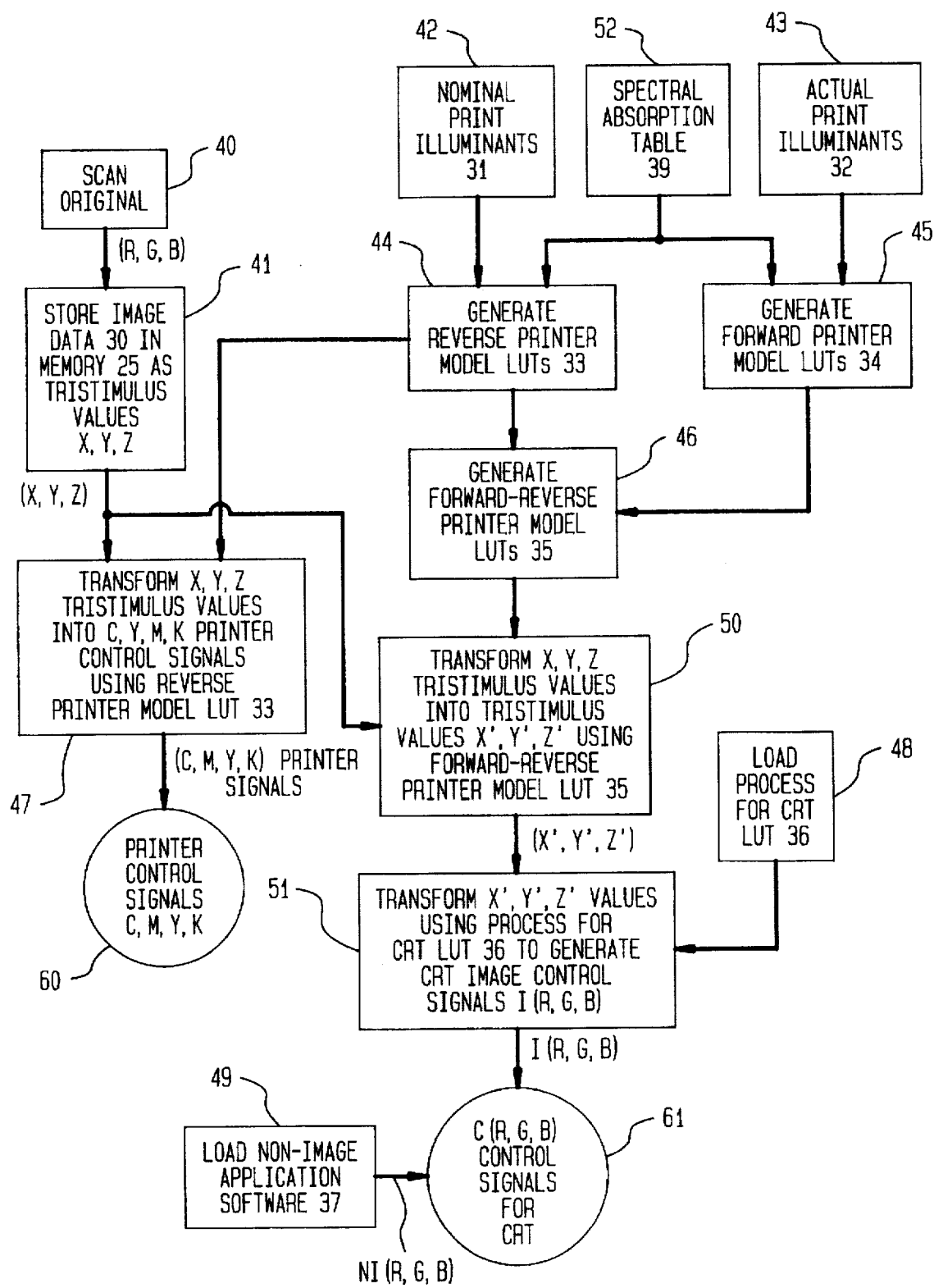
FIG. 1B is a functional block diagram illustrating the method of operation of prior art system 20 shown in FIG. 1A.

FIG. 1B shows a combination of steps that illustrate a typical operation of prior art system 20 in generating color control signals for monitor 24 and output device (printer) 26. During initial set up, printer 26 is calibrated and spectral absorption table 39 is produced through execution of step 52.

The imaging process begins, via step 40, by scanning a desired object with image input device 22 to acquire a series of tristimulus values in conventional form, e.g. R,G,B samples of the original. Thereafter, through steps 41 and 42, tristimulus values R,G,B are then converted into CIE standard X,Y,Z tristimulus values and stored in memory 25 as image data 30. Next, through steps 42 and 43, the operator inputs nominal and actual print illuminants 31 and 32, respectively, to generate, via steps 44 and 45, reverse and forward printer model LUTs 33 and 34. Thereafter, through step 46, LUTs 33 and 34 are combined to generate forward-reverse printer model LUTs 35. Once this occurs, steps 48 and 49 are performed to effectively load the process for CRT LUT 36 and non-image "application" software 37, respectively.

Then, using reverse printer model LUTs 33, computer 21 conventionally transforms, through step 47, X,Y,Z image data 30. The transformation produces conventional printer control signals 60, e.g., the standard C,M,Y,K printer control signals.

Thereafter, through step 50, computer 21 conventionally transforms tristimulus values X,Y,Z (image data 30) using forward-reverse printer model LUTs 35 to produce transformed tristimulus values X',Y',Z'. Through step 51, computer 21 transforms the tristimulus values X',Y',Z' using the process for CRT LUT 36 to generate image control signals I(R,G,B) for color monitor 24. Additionally, a set of control signals NI(R,G,B) for the non-image areas of the CRT are applied to monitor 24 via the non-image "application" software loaded in step 49. The image and non-image signals are combined, through step 61, to constitute composite control signals C(R,G,B) for CRT monitor 24.

As indicated above, color monitor 24 permits the operator to preview images of the original object before printing the image on output device 26. System 20 permits the operator to view a CRT image of the object, originally scanned in the illumination of one environment, as it would appear if illuminated by nominal illuminants 31. Additionally, system 20 will display the image on CRT monitor 24 as if it were illuminated by any one of actual illuminants 32. However, it is again noted that the non-image areas of the CRT are generated by NI(R,G,B) control signals that are formed independently of any of the illumination information.

To illustrate a typical operation of prior art system 20 in greater detail, assume that an operator wishes to evaluate the potential appearance of color prints to be produced by output device 26 (see FIG. 1A) from a single set of image data 30 to determine which prints will most likely produce a highly acceptable ("good") color match. Assume that the operator has decided to select three different nominal print illuminants 31 to drive output device 26. In effect, the operator will be evaluating which of the three different nominal print illuminants 31 will produce a print with a "good" color match by viewing CRT images of the potential prints as they will appear when illuminated by each of illuminants 31 and 32.

To do this, the operator first generates a first set of six CRT images using one of three nominal print illuminants 31, e.g. the first nominal illuminant, and five actual print illuminants 32 via LUTs 33–36 and steps 42–46, 50, 51 and 61—all as shown in FIG. 1B. The operator will then view and evaluate this set of six CRT images. This process is then repeated for the second and third nominal print illuminants 31, thereby respectively generating second and third sets of six CRT images. The operator, after viewing the three sets of CRT images, will then decide which sets have a "good" color match and, therefore, which of the three nominal illuminants 31 can be expected to produce the most suitable print when viewed under the specified illuminants 31 and 32. If, for example, the operator feels that second nominal print illuminant 31 produced the only suitable set of CRT images, then the operator may direct the computer 21 to use the spectral data associated with second nominal print illuminant 31 to drive printer (output device) 26 via steps 42, 44, 47 and 60. The print produced by system 20, using the second nominal print illuminant 31, will be expected to have an acceptable overall color match when viewed under specified illuminants 31 and 32.

It is noted that, in practice, five actual print illuminants 32 of the instant example, specified in step 43, will usually include the three nominal print illuminants 31, specified in step 42. In this way, the CRT images will include images of prints produced by each nominal print illuminant 31 as they will appear when illuminated by the other nominal print illuminants 31.

Figure 2A:
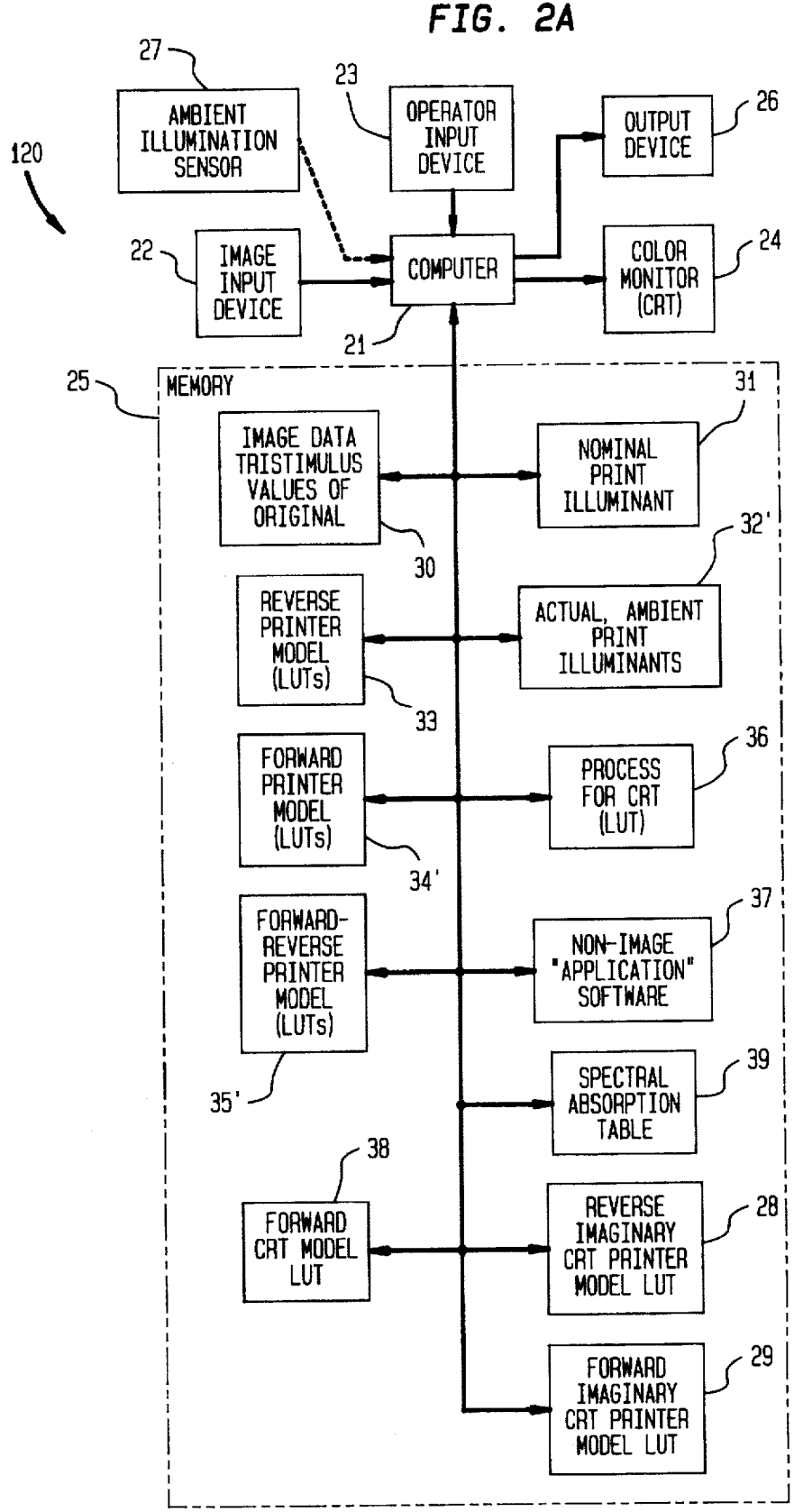
FIG. 2A is a block diagram of a preferred embodiment of my present invention.
Figure 2B:
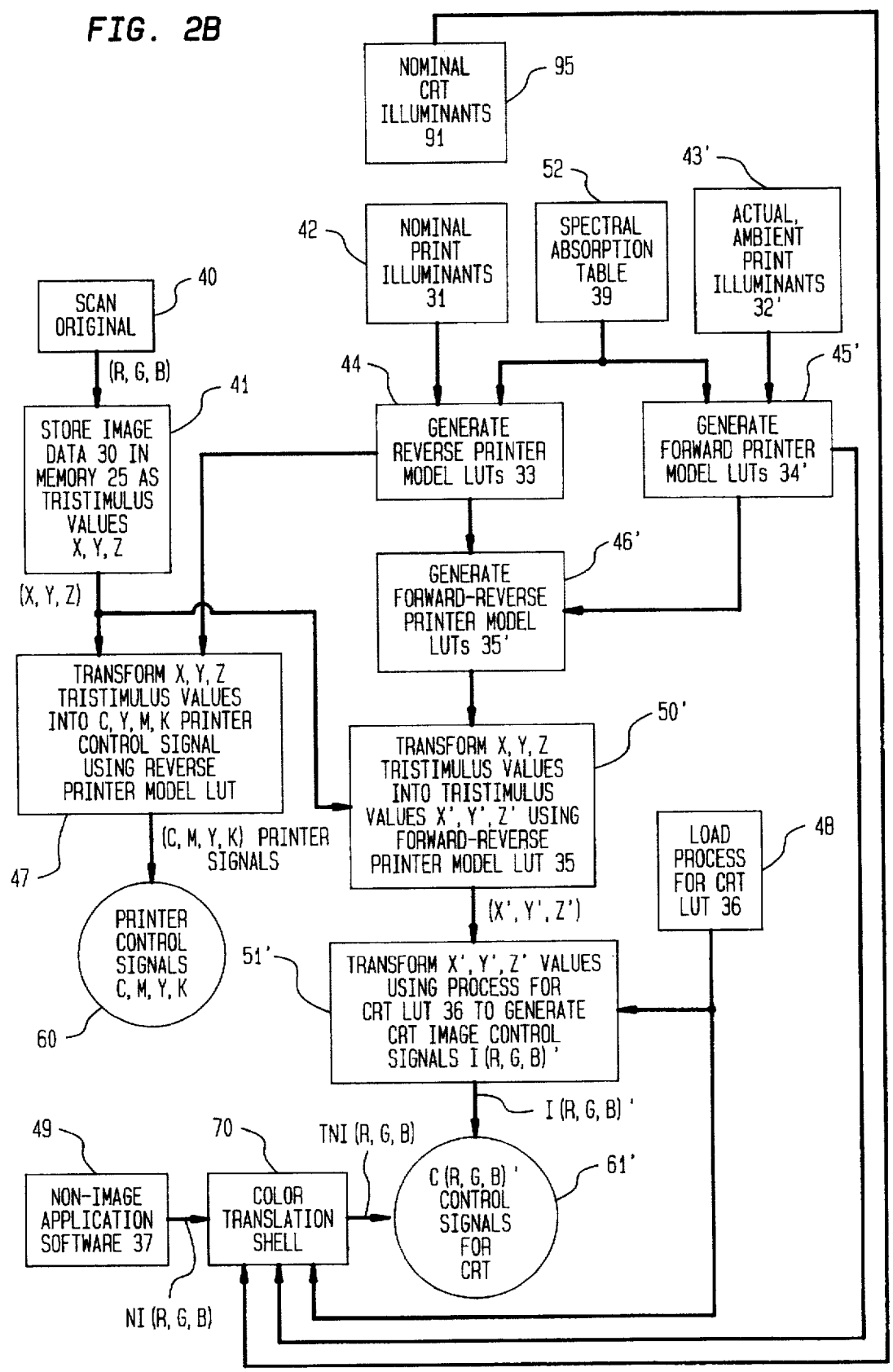
FIG. 2B is functional block diagram illustrating the method of operation of the embodiment shown in FIG. 2A.

Electronic imaging system 120 of the present invention, illustrated in FIGS. 2A and 2B, includes prior art image input device 22, computer 21 with memory 25, output device 26, color monitor 24 and operator input device 23. Additionally, system 120 also includes ambient illumination sensor 27 connected as an input to computer 21. Sensor 27 is capable of measuring the spectral content of the ambient light and provides digital spectral data concerning the ambient illumination. Ambient illumination sensor 27 may not be necessary if the spectral data of the ambient illuminants can be supplied by the operator via operator input device 23. For example, system 120 may be designed to be a dedicated system that will be permanently installed in an environment having a stable and well-defined ambient illumination; in which case, the spectral data of the ambient illumination may be permanently loaded in computer 21 at installation. However, in many cases, the ambient illumination is a mixture of sunlight and conventional room lighting that can change appreciably in relatively short time periods.

Ambient illumination sensor 27 may measure the spectral content directly or indirectly. A practical implementation for sensor 27 for directly measuring the spectral content of the illuminant may have between two and thirty-one channels, depending on the accuracy required by the application. In this regard, solid-state sensors, with a glass filter for each desired band of the spectrum, are commercially available. Sensors having as many as seventeen overlapping bands may be readily constructed at low cost.

In some environments, an indirect measurement of ambient lighting is sufficient. To indirectly determine the spectrum of the ambient illumination, sensor 27 could function as an illumination discriminator and include a single-channel sensor that can discern a 120-Hertz harmonic modulation characteristic of fluorescent or incandescent lighting, or the lack thereof as in the case of sunlight. The spectral information of such standard illumination sources, previously stored in a LUT within memory 25, could be accessed via the modulation characteristics detected by sensor 27. Suitable illumination discriminators are described in U.S. Pat. Nos. 4,827,119 (issued to M. J. Gaboury on May 2, 1989) and 4,220,412 (issued to R. A. Shroyer et al on Sep. 2, 1980), both of which are also assigned to the present assignee.

In addition to nominal print illuminants 31, as shown in FIG. 2B, nominal CRT illuminants 91 are also used. These latter illuminants can have any spectral content that is visually equivalent to the whitepoint of the CRT. For example, one may use the spectrum of a white color typically produced by existing operating system and non-imaging or application software.

As indicated above, the system and method of the present invention endeavors to achieve a "good" colorimetric match between the image areas on the CRT screen of monitor 24 and the print produced by output device 26. Many of the steps for achieving such a colorimetric match are conventional. The transformations from standardized colorspaces to and from device-specific control values can be implemented as conventional-type multidimensional look-up tables (LUTs).

As can be seen from FIGS. 2A and 2B, ambient and actual print illuminants 32' are stored, via step 43', in memory 25. The ambient illuminant, which may change significantly over relatively short time periods, is updated and stored with the actual print illuminants as indicated by numeral 32'. The current ambient illuminant data is available in memory 25 to be used by the operator to display an image of a potential print as it would appear in the ambient lighting. As indicated above, the actual print illuminants may include all or some of nominal print illuminants 31. The ambient illuminant may or may not be included in the set of nominal print illuminants 31 and/or the set of actual print illuminants. As discussed earlier, the ambient illuminant data may be supplied, through step 43', by the operator via input device 23 or by ambient illumination sensor 27.

System 120, as with prior art system 20, first scans the object, through step 40, to obtain colorimetric samples of the scanned object. Again, any acceptable set of colorimetric values may be employed, including the R,G,B tristimulus values referred to above. Using conventional techniques, the R,G,B values are then converted by computer 21 into standard tristimulus values, e.g., X,Y,Z, and stored, through step 41, in memory 25 as image data 30.

As with prior art system 20, system 120 produces reverse printer model LUTs 33 via step 44. Using reverse printer model LUTs 33 and image date 30, computer 21 conventionally transforms, through step 47, the X,Y,Z values into printer control signals C,M,Y,K—the latter shown in step 60.

Using spectral absorption table 39 and actual and ambient print illuminants 32', computer 21 generates, through step 45', forward printer model LUTs 34'. In step 46', forward-reverse printer model LUTs 35' are generated by combining LUTs 33 and 34'. Thereafter, through step 50', computer 21 transforms the X,Y,Z values into X',Y',Z' value, using forward-reverse printer model LUTs 35' and image data 30. In step 51', computer 21 transforms the X',Y',Z' values into image CRT control signals I(R,G,B)' which are then used to display the image on monitor 24 as that image would appear when illuminated by chosen ambient or actual illuminant 32'. However, in addition to previewing the print image as it would appear under ambient or actual illumination 32', computer 21 will also render the remaining portion of the CRT display (background, window borders, icons, and the like) in a manner that is influenced by ambient or actual illumination, in much the same way that colorimetric values of ordinary objects are influenced by such illumination.

As illustrated in FIG. 2B, non-image application software 37 is processed by a color translation "shell" 70 to translate the conventional non-image CRT control signals NI(R,G,B) into translated non-image CRT control signals TNI(R,G,B). The TNI(R,G,B) signals will display the non-image areas on monitor 24 with colors that would be seen if the operator were to view a print of these non-image areas under the particular actual or ambient illuminant 32' being considered. As such, both the image and non-image areas of the display on monitor 24 will have a common whitepoint that will match that of a print being viewed in illuminant 32' being considered. When viewing the image as if illuminated by the ambient light, the viewer will see both the image and the non-image areas on monitor 24 with a whitepoint that matches that of the environment, i.e. the illumination under which the operator will be viewing the print.

Figure 3:
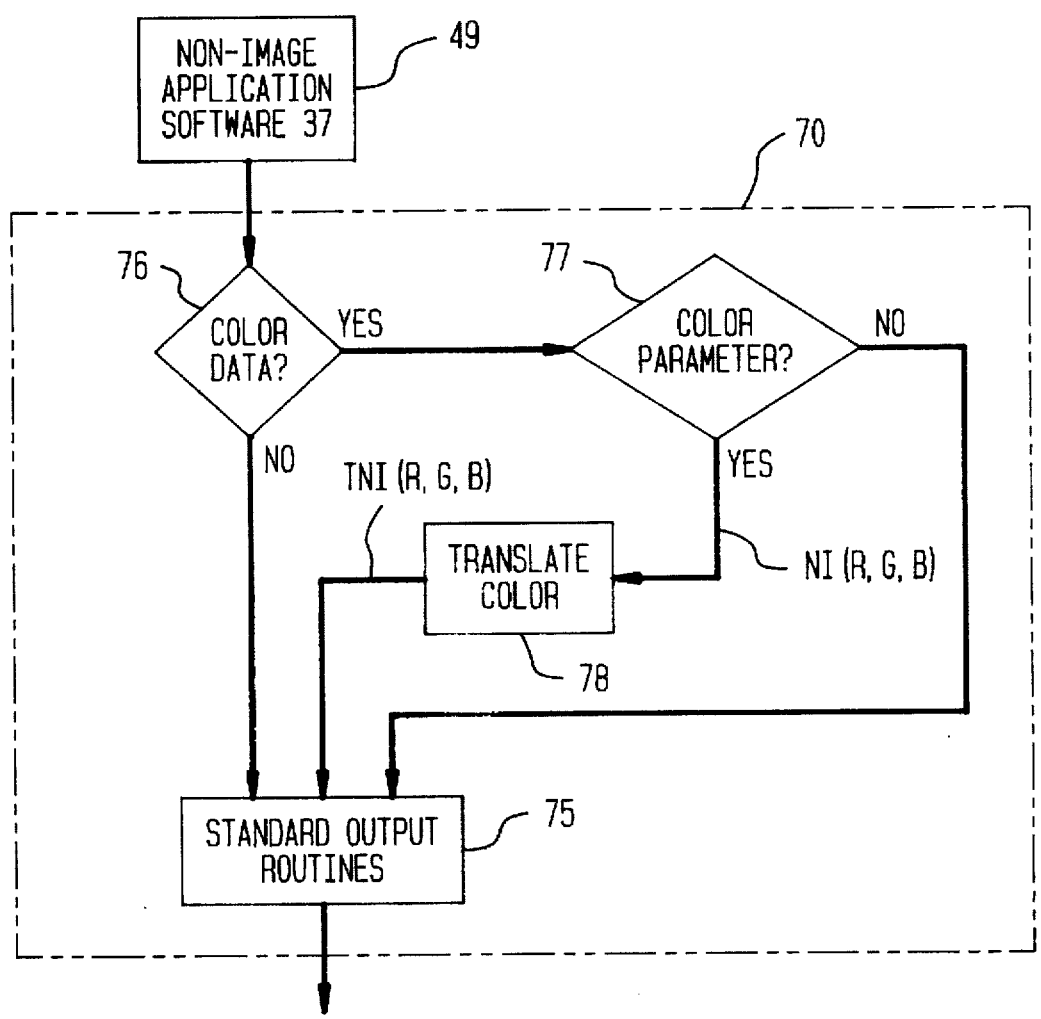
FIG. 3 is a functional block diagram illustrating the operation of the color translation shell (step 70) shown in FIG. 2B.

FIG. 3 illustrates the general translation procedure for translating the non-image signals NI(R,G,B) into the translated non-image CRT control signals TNI(R,G,B). A typical general-purpose computer, which may be executing non-imaging software, will normally use a standard set of output routines 75 that is provided by the operating system for any display output such as drawing characters or graphics. It is noted that the terms "non-imaging software" and "application software" are defined to also include parts of the operating system which perform, for example, window management, cursor movement and error and dialog messages.

Non-imaging application software 37 will specify in step 37 the desired color of an object to be drawn on monitor 24 in the non-image areas. Software 37 will specify this in an illumination-independent colorspace, typically the non-image values NI(R,G,B) used by the monitor. "Shell" 70 is built around all relevant operating-system routines, in effect inserting a thin layer of software between application software 37 and the operating system routines. Shell 70 translates the non-image values NI(R,G,B), which are illumination-independent, into translated non-image values TNI(R,G,B), which are illumination-dependent. The TNI(R,G,B) values are then passed on to operating-system routines 75.

Specifically, within step 70, non-color data is sent directly, by step 76, to standard output routines 75. Alternatively, the color data is separated, via steps 76 and 77, from the color parameters to leave the NI(R,G,B) signals. In step 78, the NI(R,G,B) values are transformed into translated CRT control signals TNI(R,G,B).

Figure 4:
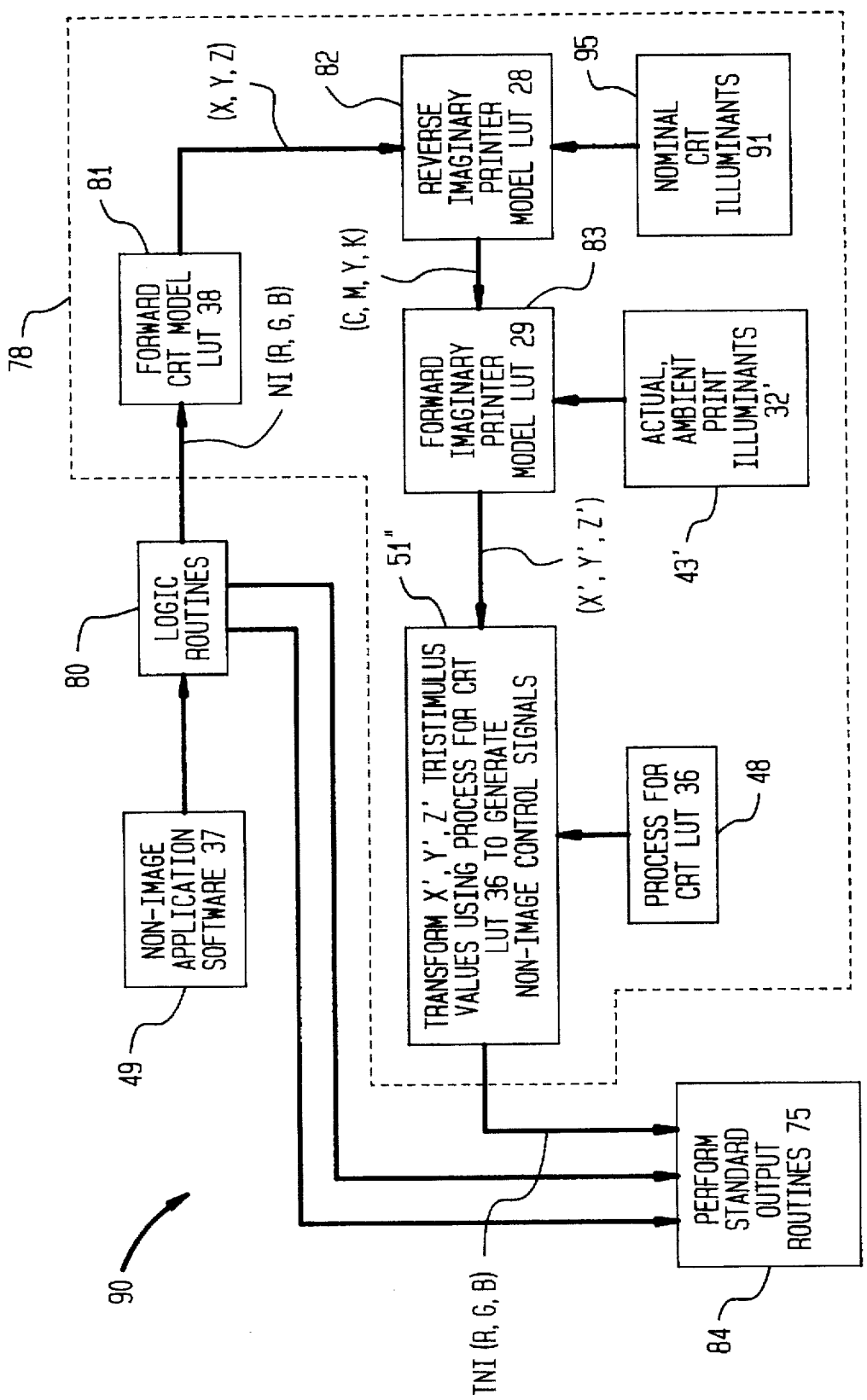
FIG. 4 is a functional block diagram illustrating in detail Translate Color Step 78 shown in FIG. 3.

FIG. 4 illustrates in greater detail the steps involved in translating the non-image (illumination-independent) CRT control signals NI(R,G,B) into the translated (illumination-dependent) CRT control signals TNI(R,G,B). Step 80 represents logic routines that isolate the NI(R,G,B) data from the other non-image data as was indicated by steps 76 and 77 shown in FIG. 3. Within step 81 shown in FIG. 4, conventional forward CRT model LUT 38 transforms the NI(R,G,B) values into the standard tristimulus values X,Y,Z. Next, via step 82, reverse printer model LUT 28 for an imaginary printer transforms the X,Y,Z values into printer signals C,M,Y,K for the imaginary printer using nominal CRT illuminant 91. The imaginary printer may or may not represent a real printer and is chosen for convenience only. The C,M,Y,K values are then changed, through step 83, into the transformed tristimulus values X',Y',Z' using forward printer model LUT 29 for the imaginary printer and actual or ambient illuminant 32'. Transformed tristimulus values X',Y',Z' are now illumination dependent, having first been transformed into printer signals (C,M,Y,K) using nominal CRT illuminant 91 and then transformed, using the appropriate actual or ambient illuminant 32', into values X',Y',Z'. The transformed tristimulus values X',Y',Z' are now routinely transformed, through step 51", with the process for CRT LUT 36 into illumination-dependent CRT control signals, designated here as translated non-image CRT control signals TNI(R,G,B). The TNI(R,G,B) control signals are combined, through step 84, with appropriate non-color and other non-image application software signals. Once step 80 is complete, then, as shown in FIG. 2B, the composite CRT control signals C(R,G,B)' are formed and applied to monitor 24 via step 61'.

It is noted that those skilled in these arts should be readily familiar with the formation of CRT and printer models including forward CRT model LUT 38, reverse imaginary printer model LUT 28 and forward imaginary printer model LUT 29. Furthermore, the color transformation applied to CRT monitor 24 is similar to that used to predict printer output colors. The color specifications supplied by the application software are translated, via steps 81 and 82, into printer control values C,M,Y,K as if on a print, and then the appearance of this print is calculated, through step 83, based on the actual or ambient illuminants 32'. The first portion of this process, i.e. steps 81 and 82, is analogous to generating an imaginary print from data in the R,G,B colorspace of the monitor. The illumination-independent R,G,B value, as supplied by the application software, is first converted to X,Y,Z values according to the calibration of monitor 24 which produces forward CRT model LUT 38. The control values C,M,Y,K for the imaginary printer are then computed, based on reverse imaginary print model LUT 28, as if the print were intended to be illuminated at the whitepoint of the CRT display of monitor 24. To preserve the gamut range of the CRT, negative C,M,Y,K dye concentrations may be allowed since, after all, the printer is imaginary and system 120 will not actually be printing based on these values. The negative values may be thought of as amplifying the respective region of the spectrum, rather than attenuating it. For simplicity, a C, M, Y printer may alternatively be used.

The latter portion of the process, steps 83 and 51", function similarly to the print preview processing described earlier. Forward imaginary printer model LUT 29 determines the apparent color, given the control signals C,M,Y,K and the spectral distribution of the actual or ambient illuminant, and maps this into X',Y',Z' values. Then, using the monitor calibration, the X',Y',Z' values are converted into the illumination-dependent TNI(R,G,B) values as given to operating system routines 75. It is noted that forward imaginary printer model LUT 29 depends on the actual or ambient illuminants 32', specifically on which illuminant is being previewed. In the case of the ambient illuminant, forward imaginary printer model LUT 29 must be recalculated each time that the ambient illuminant changes.

The above process steps can be combined into one LUT. Note that the printer model used for color translation of non-image areas need not be the same as the printer model used for the image; for example, any "reasonable" arbitrary dye absorption spectra may be used to model the printer for color translation.

Figure 5:
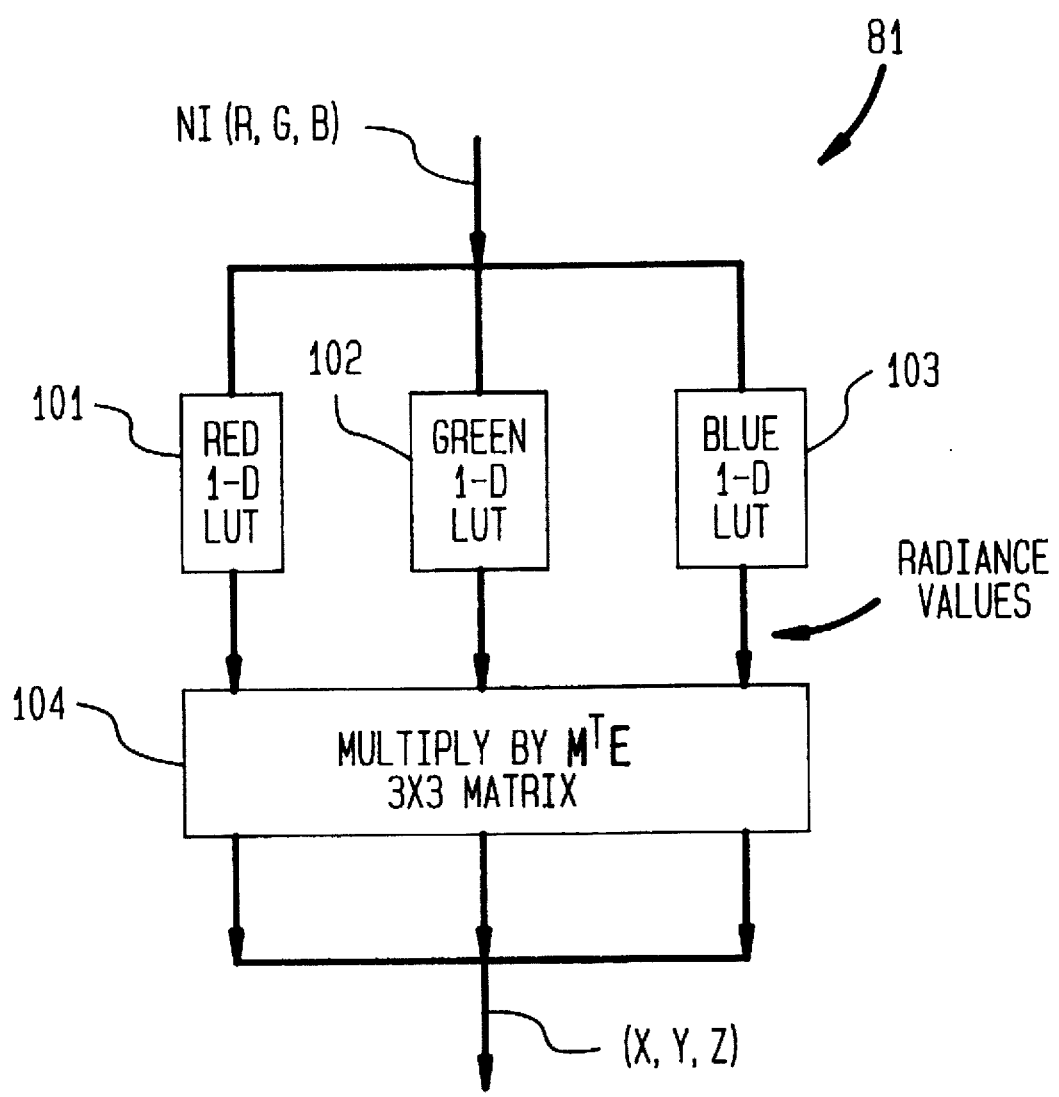
FIG. 5 is a functional block diagram illustrating the transformation for the Forward CRT Model Look Up Table (LUT) (step 81) shown in FIG. 4.
Figure 6:
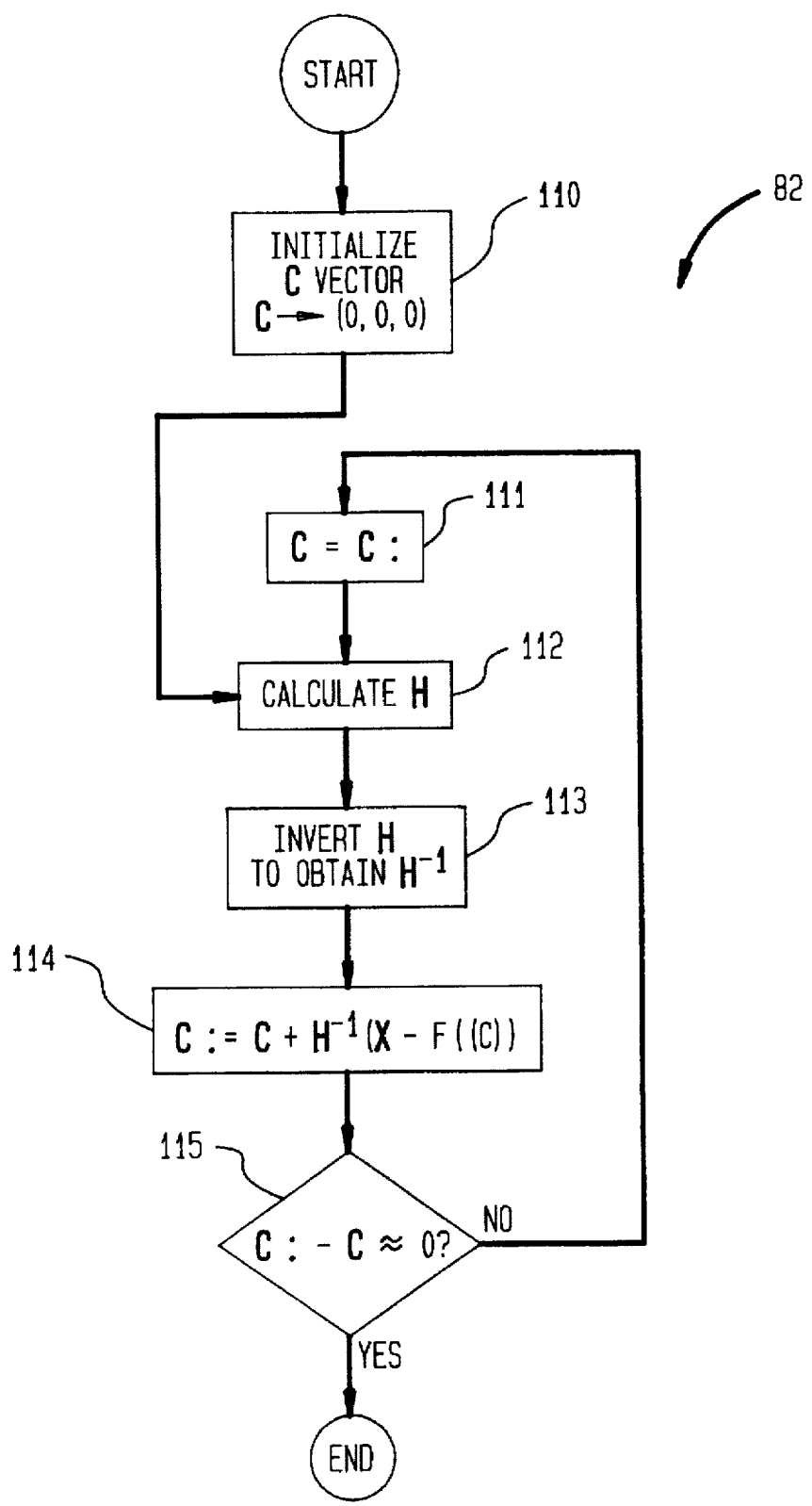
FIG. 6 is a functional block diagram illustrating the transformation for the Reverse Imaginary Printer Model LUT (step 82) shown in FIG. 4.
Figure 7:
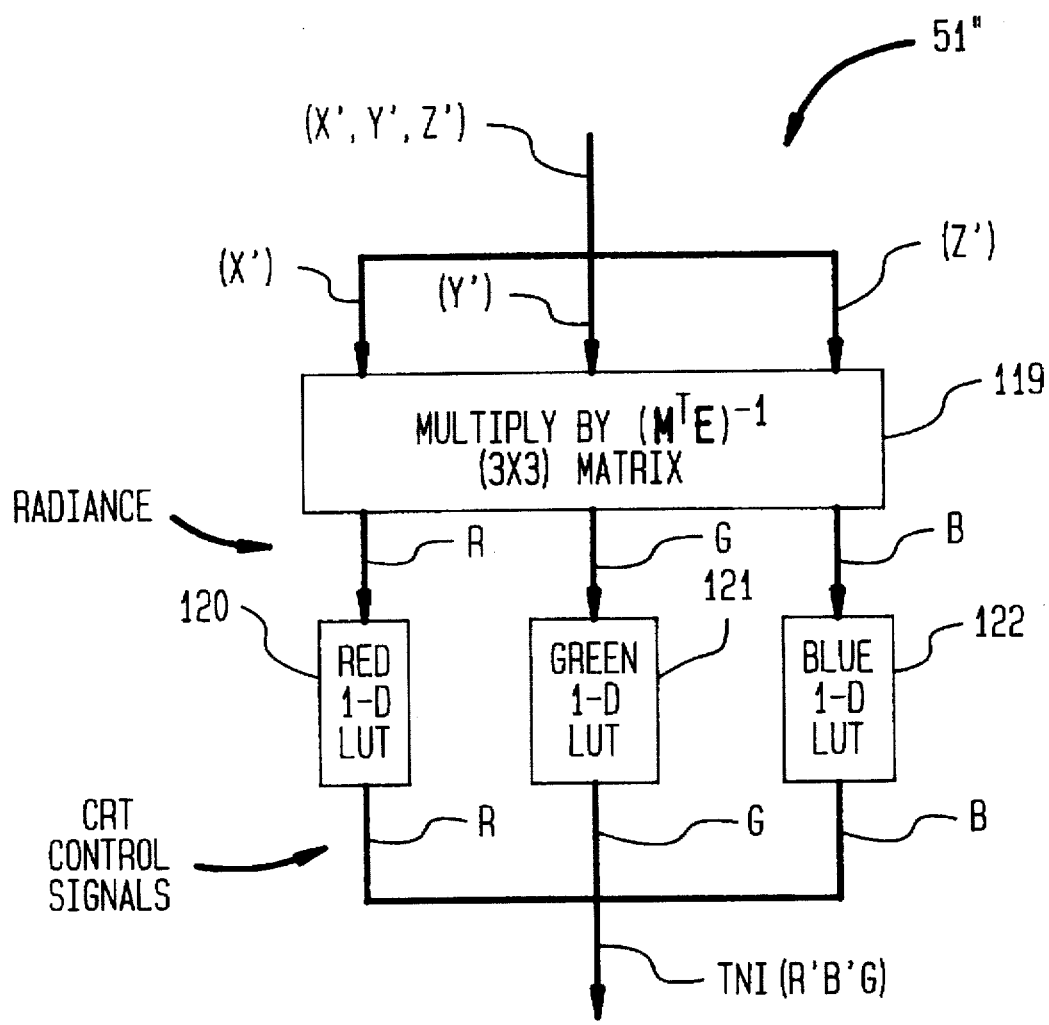
FIG. 7 is a functional block diagram illustrating Tristimulus Value Transforming Step 51" shown in FIG. 4.

Specific examples of the computer transformations involved in steps 81, 82 and 51" are illustrated in FIGS. 5–7.

As shown, FIG. 5 illustrates the calculations performed by forward CRT model LUT 38 in step 81. The NI(R,G,B) values, which represent typical CRT control signals for the non-image areas, are transformed into radiance values by three one-dimensional (1-D) LUTs; namely, RED 1-D LUT 101, GREEN 1-D LUT 102, and BLUE 1-D LUT 103. The radiance values are multiplied, in step 104, by a (3×3) matrix $M^T E$ to produce the X,Y,Z tristimulus values, where $M^T$ is a conventional (3×31) CIE color matching function matrix and E is a conventional (31×3) phosphor emission spectra matrix, as measured. The matrix dimension "31" is used as a typical example and assumes that the spectrum is sampled in 10 nm increments, from 400 nm to 700 nm. Of course, finer sampling and/or a larger range of the spectrum may be used if desired.

The computer transformation performed in step 82 by the reverse imaginary printer model LUT 28 may be performed using the following equation:

$$x = M^T I_{v1}\, 10^{-(Dc)} = F(c) \qquad (1)$$

where:

c represents the C,M,$Y_c$ values of a dye concentration vector (only three values are used instead of the four, C,M,Y,K, for simplification. Since the "Y" in the X,Y,Z and C,M,Y values are not the same, they will be designated here as $Y_x$ and $Y_c$, respectively, to avoid confusion);

D is a (31×3) dye spectral density matrix;

$I_{v1}$ is a (31×31) diagonal illumination matrix for nominal CRT illuminant 91 (spectral illumination values situated on the diagonal of the matrix and zeros elsewhere);

$M^T$ is a (3×31) CIE color matching function matrix; and x represents the X,$Y_x$,Z values.

Equation (1) may be solved (as occurs in FIG. 6) by using a well-known Newton-Raphson search to find its inverse, i.e. c as a function of x. In performing the Newton-Raphson search, the matrix variable H is defined as follows:

$$H = F'(c) = \begin{bmatrix} \frac{\partial f_1}{\partial C} & \frac{\partial f_1}{\partial M} & \frac{\partial f_1}{\partial Y_c} \\ \frac{\partial f_2}{\partial C} & \frac{\partial f_2}{\partial M} & \frac{\partial f_2}{\partial Y_c} \\ \frac{\partial f_3}{\partial C} & \frac{\partial f_3}{\partial M} & \frac{\partial f_3}{\partial Y_c} \end{bmatrix} \qquad (2)$$

where:

$f_1, f_2, f_3$ are the three component functions of F(c). Equation (2) will then yield:

$$H = F'(c) = \begin{bmatrix} \frac{\partial X}{\partial C} & \frac{\partial X}{\partial M} & \frac{\partial X}{\partial Y_c} \\ \frac{\partial Y_x}{\partial C} & \frac{\partial Y_x}{\partial M} & \frac{\partial Y_x}{\partial Y_c} \\ \frac{\partial Z}{\partial C} & \frac{\partial Z}{\partial M} & \frac{\partial Z}{\partial Y_c} \end{bmatrix} \qquad (3)$$

The Newton-Raphson search (used in the implementation of step 82 shown in FIG. 6) begins, through step 110, with the initialization of the c vector. For example, the c vector, having components C,M,$Y_c$, may be set equal to (0,0,0) as a reasonable initial value. The c vector is then used in step 112 to calculate H by a numerical calculation of the partial derivatives. Matrix H is then inverted, via step 113, to obtain $H^{-1}$. The value c: is calculated, through step 114, using the following equation:

$$c: = c + H^{-1}(x - F(c)) \qquad (4)$$

In step 115, the difference between c: and c is determined. If the difference is small, then the process is ended and the C,M,$Y_c$ values for the latest c: are supplied as output values. If, however, the difference is large, then c is assigned the value of c: in step 111. The process is then repeated until the difference calculated in step 115 is sufficiently small.

To convert from the C,M,Y (or C,M,Y,K) values to the X',Y',Z' values in step 83 (see FIG. 4) the following calculation may be carried out:

$$x' = M^T I_{v2}\, 10^{-(Dc)} \qquad (5)$$

where:

x' represents the output values X',Y',Z';

c represents the input values C,M,Y (or C,M,Y,K);

D is a (31×3) dye spectral density matrix;

$I_{v2}$ is a diagonal illumination spectra matrix for the actual or ambient illuminants 32' (the actual or ambient spectral illumination values are located on the diagonal and zeros are located elsewhere); and $M^T$ is a (3×31) CIE color matching function matrix.

FIG. 7 shows typical computer calculations that may be carried out in step 51" to convert the X',Y',Z' values to the translated non-image CRT control signal TNI(R,G,B). The X',Y',Z' values are multiplied, in step 119, by the inverse of the (3×3) matrix $M^T E$ used in step 81 (see FIG. 5). The multiplication resulting from step 119 shown in FIG. 7 will produce R,G,B radiance values that are transformed into the TNI(R,G,B) values via the RED, GREEN and BLUE one-dimensional LUTs in steps 120, 121 and 122, which are the inverse of the transfer functions of each of the CRT channels, as measured, i.e. control signal as a function of radiance.

Figure 8:
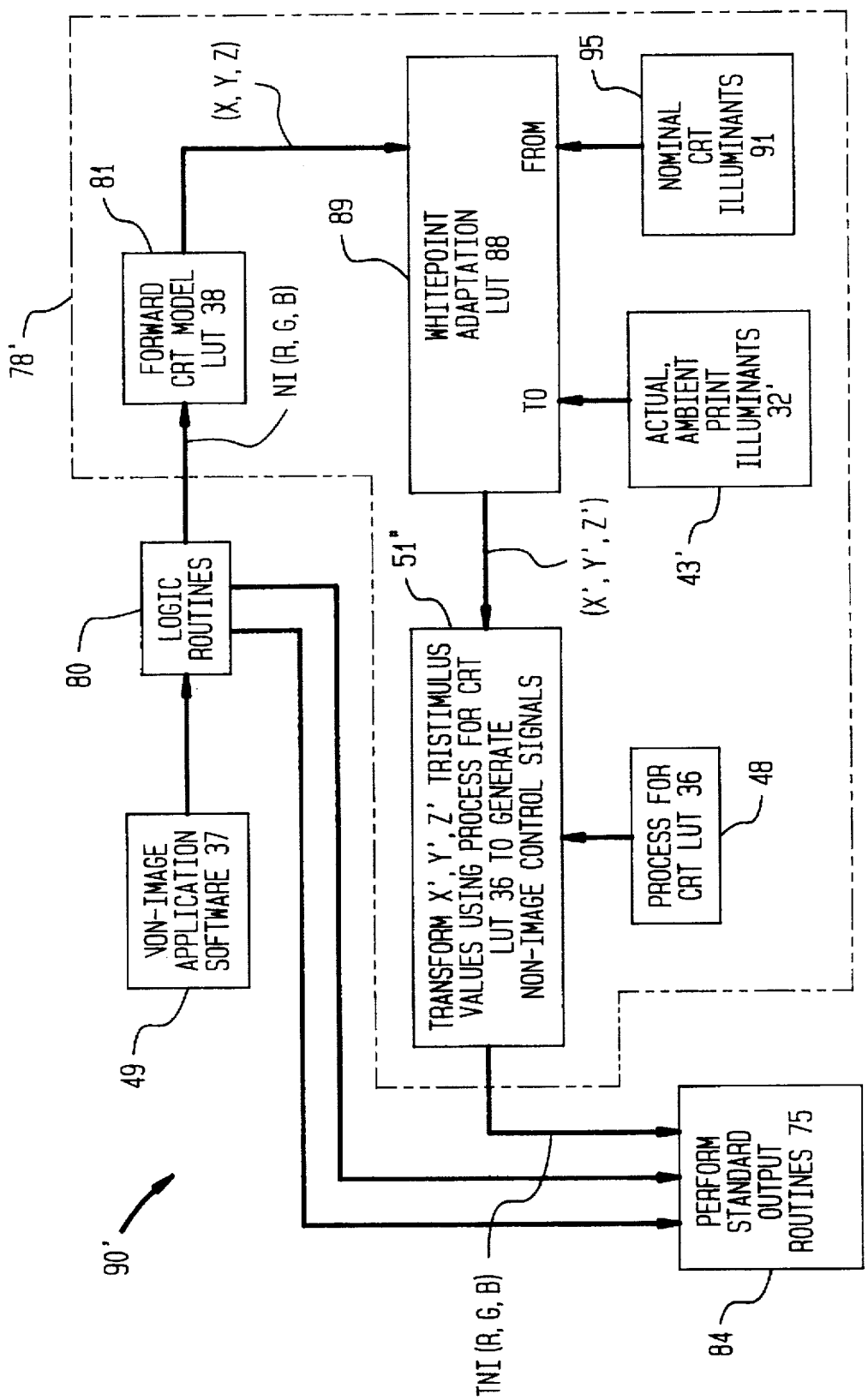
FIG. 8 is a functional block diagram, similar to FIG. 4, illustrating a modification to my preferred embodiment.

FIG. 8 illustrates an alternative color translation system 90' for use in translating color in accordance with step 78 of FIG. 3. System 90' is similar to system 90 shown in FIG. 4 with the only difference therebetween being the elimination of forward and reverse imaginary printer model LUTs 28 and 29, and the substitution of whitepoint adaptation step 89 therefor. The mapping of the X,Y,Z values into the X',Y',Z' values is the reverse of the adaptation method disclosed in co-pending U.S. patent application "Method for the Reproduction of Color Images Based on Viewer Adaptation" (Ser. No. 07/678,485; filed Apr. 1, 1991 by inventor D. Statt—the "Statt application", and also assigned to the present assignee) which is incorporated by reference herein.

In the adaptation method disclosed in the Statt application, conversion is made from the whitepoint of the illuminant to the whitepoint of the monitor. System 90' shown in FIG. 8 converts from the whitepoint of the monitor to the whitepoint of the actual or ambient illuminant 32' using the whitepoint adaptation LUT 88. Alternative system 90' still requires conversion from the illumination-independent NI(R,G,B) values into the tristimulus values X,Y,Z via the forward CRT model LUT 38. The adaptation process, through step 89, converts the X,Y,Z values into the X',Y',Z' values which are then converted, through step 51", into illumination-dependent TNI(R,G,B) values. It is noted that the adaptation LUT 88 is created based on the whitepoints of the nominal illuminant 31 and the actual or ambient illuminants 32', and must be recalculated when these change.

Although various embodiments of my present invention have been shown and described in detail herein, many other varied embodiments that incorporate the teachings of this invention may be easily constructed by those skilled in the art.

INDUSTRIAL APPLICABILITY AND ADVANTAGES

The present invention is useful in electronic imaging systems and particularly for implementing an accurate print preview function in such systems. Through use of the inventive technique, a highly acceptable color match can be obtained, even under a variety of different illuminants, between a color image as previewed on a CRT monitor and that which will appear on a color print generated by such a system. As such, the invention will permit a user of an electronic imaging system to generate more accurate color prints than has heretofore occurred through use of electronic imaging systems known in the art.

I claim:

1. A color electronic imaging system for processing color input data of an object, the system comprising:

an illumination input means for providing spectral content data representative of the spectral content of an ambient illuminant under which a print of an image of said object will be viewed;

a color display monitor for displaying thereon said object image;

a computer connected to said illumination input means and said color display monitor, wherein said computer uses said spectral content data to transform said color input data such that colors of said object image will appear on said display monitor substantially as said colors would appear on said print of said object image when said print is viewed under said ambient illuminant; and wherein said illumination input means further includes light sensing means for sensing the spectral content of the ambient illuminant, and wherein said light sensing means includes approximately seventeen channels, each of said channels measuring a component of said spectral content occurring in a desired frequency band of the spectrum.

2. The system of claim 1 wherein said illumination input means includes:

an illumination discriminator for detecting the modulation characteristics of a standard ambient light source to identify whether said standard ambient light source is comprised of fluorescent lighting, incandescent lighting or sunlight; and storage means for storing said spectral content corresponding to each of said standard ambient light sources.

3. The system of claim 1 wherein said illumination input means includes means for manually inputting said data representative of said spectral content of said ambient illuminant.

4. The system of claim 1 wherein said illumination input means further includes light sensing means for sensing the spectral content of the ambient illuminant, and wherein said light sensing means periodically senses said spectral content of said ambient illuminant.

5. The system of claim 1 wherein said illumination input means further includes light sensing means for sensing the spectral content of the ambient illuminant, and wherein said light sensing means continuously senses said spectral content of said ambient illuminant.

6. The system of claim 1 wherein said computer is operative to adapt a whitepoint of said color input data to match a whitepoint of said print when said print is viewed under said ambient illuminant.

7. A method of reproducing a color image comprising:

providing color input data of an object;

providing data representative of the spectral content of selective illuminants that may illuminate a print of said object;

providing non-image color control signals for displaying non-image information on a color monitor, said non-image information being any information on said monitor that is not a part of an image of said object;

transforming said color input data and said non-image color control signals into a composite color control signal for said monitor;

displaying on said monitor, in response to said composite color control signal, a color image of said object and said non-image information as they would appear on a print if said print were to be viewed under one of said selective illuminants; and wherein said transforming step further comprises the steps of:

transforming said non-image color control signals into a first set of colorimetric values;

transforming said first set of colorimetric values, using a first one of said selective illuminants, into printer control signals for an arbitrary printer;

transforming said printer control signals, using a second one of said selective illuminants, into a second set of adapted colorimetric values; and transforming said second set of adapted colorimetric values into translated non-image color monitor control signals, said translated non-image color monitor control signals having a whitepoint equal to that of said second selective illuminant.

8. The method of claim 7 wherein said color input data includes a first set of colorimetric values related to the spectrum of the radiant flux from said object.

9. The method of claim 7 wherein said transforming step includes the step of adapting the whitepoint of each of said color input data and said non-image color control signals to a whitepoint that will match the whitepoint of a print being viewed under said selective illuminant.

10. The method of claim 7 wherein one of said selective illuminants is the ambient illuminant.

11. The method of claim 10 wherein said step of providing data representative of the spectral content of said ambient illuminant includes the step of utilizing an illumination sensor to sense said spectral content of said ambient illumination.

12. The method of claim 10 wherein said step of providing data representative of the spectral content of said ambient illuminant includes the steps of utilizing an illumination discriminator to identify whether said ambient illuminant is comprised of fluorescent lighting, incandescent lighting or sunlight and retrieving from a storage means said spectral content corresponding to said identified standard ambient light source.

13. The method of claim 10 wherein said step of providing data representative of the spectral content of said ambient illuminant is manually entered.

14. A color electronic imaging system comprising:

a color input means for providing color input data of an object;

an illumination input means for providing data representative of the spectral content of selective illuminants that may illuminate a print of said object;

a color display monitor for displaying an image of said object and non-image information thereon, said non-image information being any information on said monitor that is not a part of said image of said object; and a computer connected to said color input means, said illumination input means, and said color display monitor, and wherein said computer includes means for providing non-image color control signals for displaying said non-image information on said monitor, and a transformation means for transforming said color input data and said non-image color control signals into a composite color control signal for said monitor for displaying on said monitor a color image of said object and said non-image information as they would appear on a print if said print were to be viewed under a selective illuminant; and wherein said transformation means comprises:

a first means for transforming said non-image color control signals into a first set of colorimetric values;

a second means using a first one of said selective illuminants for transforming said first set of colorimetric values into printer control signals for an arbitrary printer;

a third means using a second one of said selective illuminants for transforming said printer control signals into a second set of adapted colorimetric values; and a fourth means for transforming said second set of adapted colorimetric values into translated non-image color monitor control signals, said translated non-image color monitor control signals having a whitepoint equal to that of said second selective illuminant.

15. A method of reproducing a color image comprising:

providing color input data of an object;

providing data representative of the spectral content of selective illuminants that may illuminate a print of said object;

providing non-image color control signals for displaying non-image information on a color monitor, said non-image information being any information on said monitor that is not a part of an image of said object;

transforming said color input data and said non-image color control signals into a composite color control signal for said monitor; and displaying on said monitor, in response to said composite color control signal, a color image of said object and said non-image information as they would appear on a print if said print were to be viewed under one of said selective illuminants; and wherein said transforming step further comprises the steps of:

transforming said non-image color control signals into a first set of colorimetric values;

transforming said first set of colorimetric values having a whitepoint equal to that of said monitor, using said selective illuminants, into a second set of adapted colorimetric values having a whitepoint equal to that of said selective illuminant; and transforming said second set of adapted colorimetric values into translated non-image color monitor control signals.

16. The method of clam 15 wherein said first and second set of colorimetric values are tristimulus values.

17. The method of clam 15 further including the step of generating a forward CRT model look-up table for transforming said non-image color control signals into said first set of colorimetric values.

18. A method of reproducing a color image comprising:

providing color input data of an object;

providing data representative of the spectral content of selective illuminants that may illuminate a print of said object;

providing non-image color control signals for displaying non-image information on a color monitor, said non-image information being any information on said monitor that is not a part of an image of said object;

transforming said color input data and said non-image color control signals into a composite color control signal for said monitor; and displaying on said monitor, in response to said composite color control signal, a color image of said object and said non-image information as they would appear on a print if said print were to be viewed under one of said selective illuminants; and wherein said transforming step further comprises the steps of:

transforming said non-image color control signals into a first set of colorimetric values;

transforming said first set of colorimetric values, using a first one of said selective illuminants, into printer control signals for an arbitrary printer;

transforming said printer control signals, using a second one of said selective illuminants, into a second set of adapted colorimetric values; and transforming said second set of adapted colorimetric values into translated non-image color monitor control signals, said translated non-image color monitor control signals having a whitepoint equal to that of said second selective illuminant.

19. The system of claim 18 wherein said first and second set of colorimetric values are tristimulus values.

20. The system of claim 18 wherein said first means includes a forward CRT model look-up table for transforming said non-image color control signals into said first set of colorimetric values.

21. The system of claim 18 wherein said second means includes a reverse printer model look-up table for said arbitrary printer for transforming said first set of colorimetric values into printer control signals for said arbitrary printer.

22. The system of claim 18 wherein said third means includes a forward printer model look-up table for said arbitrary printer for transforming said printer control signals into said second set of adapted colorimetric values.

23. The method of claim 18 wherein said first and second set of colorimetric values are tristimulus values.

24. The method of claim 18 further including the step of generating a forward CRT model look-up table for transforming said non-image color control signals into said first set of colorimetric values.

25. The method of claim 18 further including the step of generating a reverse printer model look-up table for said arbitrary printer for transforming said first set of colorimetric values into printer control signals for said arbitrary printer.

26. The method of claim 18 further including the step of generating a forward printer model look-up table for said arbitrary printer for transforming said printer control signals into said second set of adapted colorimetric values.

* * * * *